Figure 1:
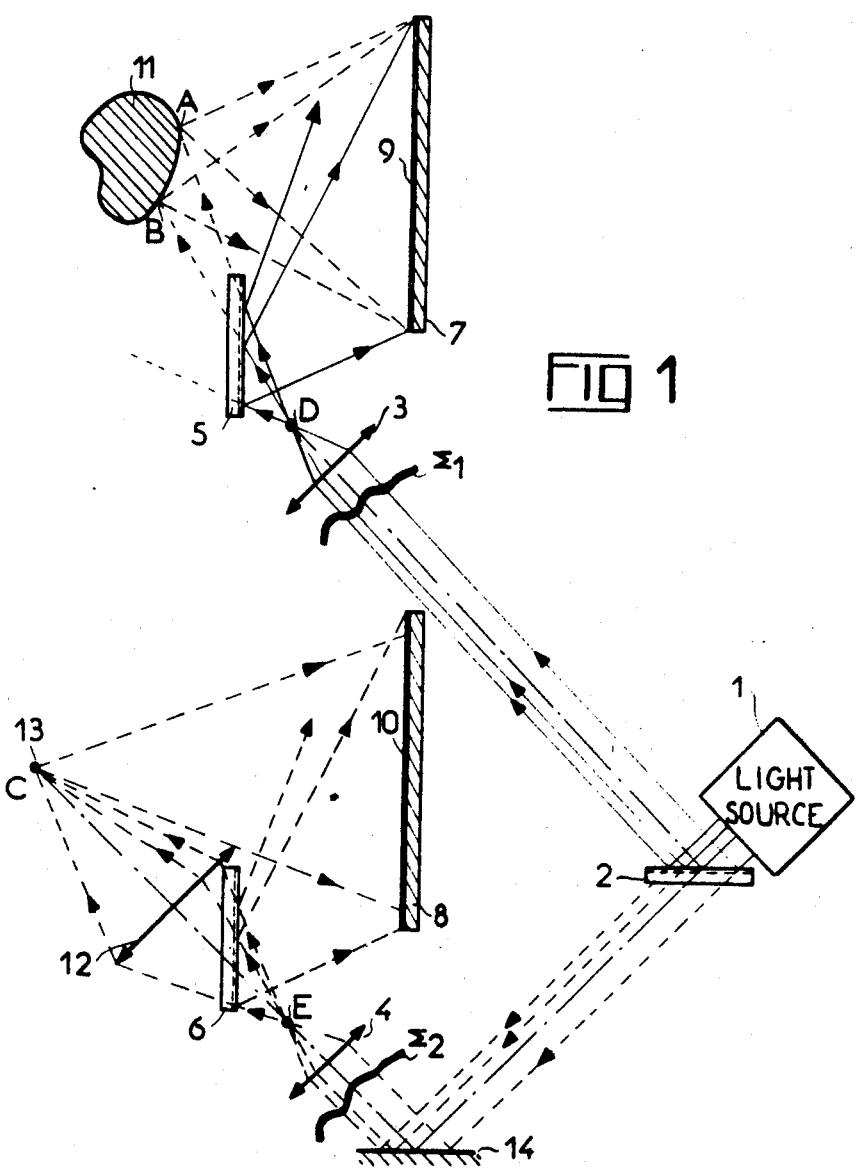

United States Patent

[11] 3,633,986

| [72] | Inventors | Georges Broussaud;<br>Pierre L. Wang, both of Paris, France |
|---|---|---|
| [21] | Appl. No. | 24,751 |
| [22] | Filed | Apr. 1, 1970 |
| [45] | Patented | Jan. 11, 1972 |
| [73] | Assignee | Thomson-CSF |
| [32] | Priority | Apr. 11, 1969 |
| [33] | | France |
| [31] | | 6911212 |

[54] HOLOGRAPHIC RECORDING SYSTEM WITH A SEPARATELY RECORDED REFERENCE BEAM
17 Claims, 5 Drawing Figs.

[52] U.S. Cl..................................... 350/3.5, 350/162 SF
[51] Int. Cl........................................ G02b 27/00
[50] Field of Search.......................... 350/3.5, 162 SF

[56] References Cited
UNITED STATES PATENTS
3,519,322  7/1970  Brooks et al.............. 350/3.5

*Primary Examiner*—David Schonberg
*Assistant Examiner*—Ronald J. Stern
*Attorney*—Cushman, Darby & Cushman ABSTRACT: For rapidly constructing holograms with pulsed light issued for example from a pulsed laser the light used to form a normal hologram is also used to form a second hologram by illuminating a second emulsion directly by this light and by a punctual luminous source formed by means of this light.

For the reconstruction of the hologram the second hologram is used as a reference source.

PATENTED JAN 11 1972

3,633,986

SHEET 1 OF 4

3,633,986

HOLOGRAPHIC RECORDING SYSTEM WITH A SEPARATELY RECORDED REFERENCE BEAM

The present invention relates to optical systems in which recording and reproduction of the image of an object employ a procedure based on holography.

A hologram is formed by a photographic emulsion in the body of which a pattern of interference fringes is caused to appear which is characteristic of the optical information relating to the object. When placed in a beam of coherent light, a hologram produces a scattered image of the object. For constructing a hologram, high-resolution photographic emulsions having a low sensitivity to light are used. Since, the light source used to act on the photographic emulsion has to produce highly coherent light waves it is necessary to employ gas lasers or monomode lasers of relatively low emissive power. Since furthermore, the light should illuminate the photographic emulsion over the whole of its area without being concentrated by means of lenses, it will readily be appreciated that the recording of the hologram requires an exposure time which can reach several minutes.

For making rapid holographic recordings, it is necessary to resort to coherent light sources of high power, which requires the use of pulsed lasers such as ruby lasers; it is even possible to envisage the use of lasers with delayed triggering, since the giant pulses thus produced are extremely short and their peak power can reach levels in the order of some hundreds of megawatts. However, this has not been possible so far because the light waves emitted by pulsed lasers are characterized by phase and amplitude distributions which change in uncontrollable fashion from one light pulse to the next.

It is an object of the invention to provide an arrangement for forming holograms with a coherent light source of the type of a pulsed laser i.e. with sources wherein the emitted wave front is not necessarily reproducible.

According to the invention there is provided an arrangement for constructing an holographic representation of an object by means of a source of coherent light which need not have reproducible wave fronts said arrangement comprising: means for splitting said light into two beams having the same wave fronts; means for directing onto said object a portion of one of said beams; a first photographic emulsion located for simultaneously receiving the light emitted by said object and another portion of said one beam; means for constructing from one portion of the other beam a punctual source; and a second photographic emulsion located for simultaneously receiving another portion of said other beam and the light emerging from said punctual source.

Figure 2:
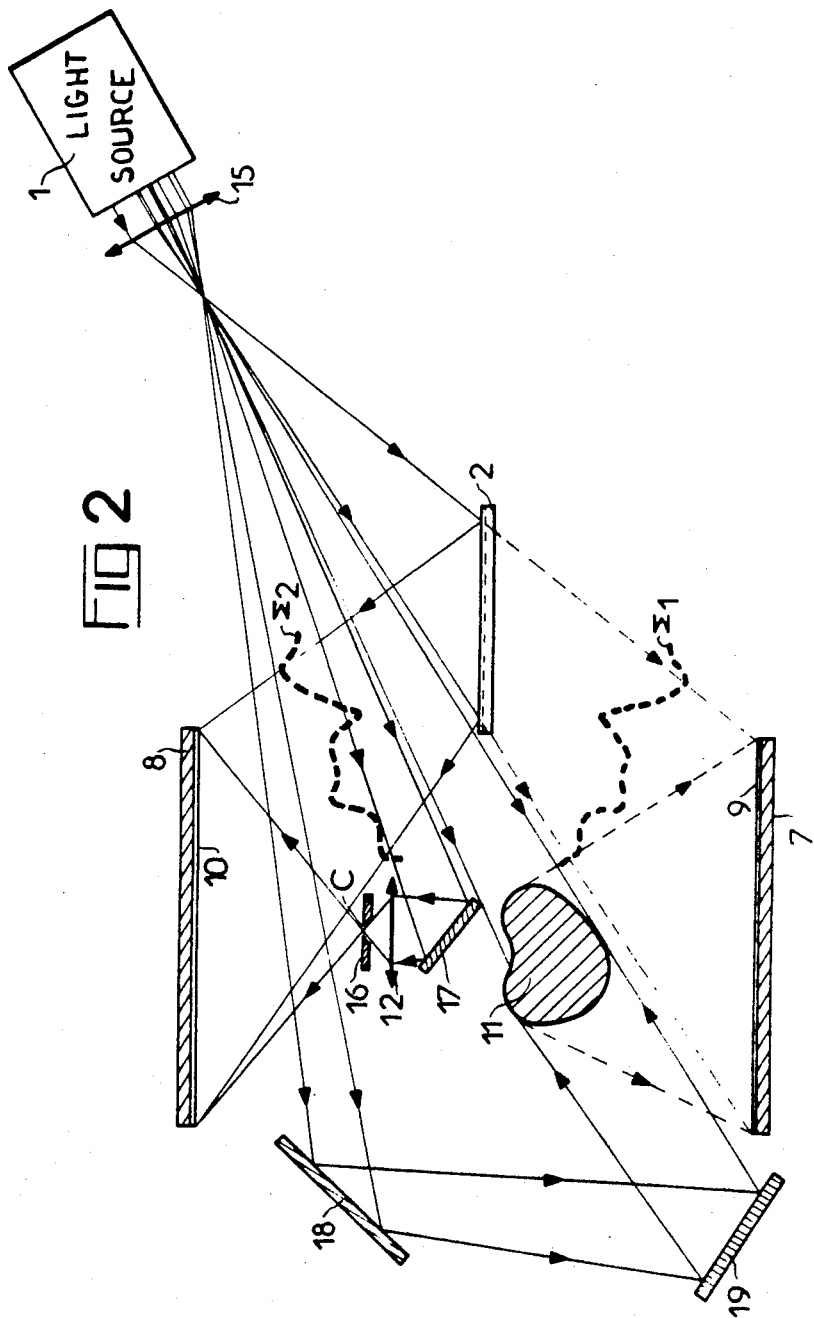

For a better understanding of the invention and to show how the same may be carried into effect reference will be made to the drawing accompanying the ensuing description and in which:

FIG. 1 schematically illustrates a first embodiment of the arrangement for constructing holograms of objects according to the invention;

FIG. 2 schematically illustrates a variant embodiment of the arrangement shown in FIG. 1.

Figure 3:
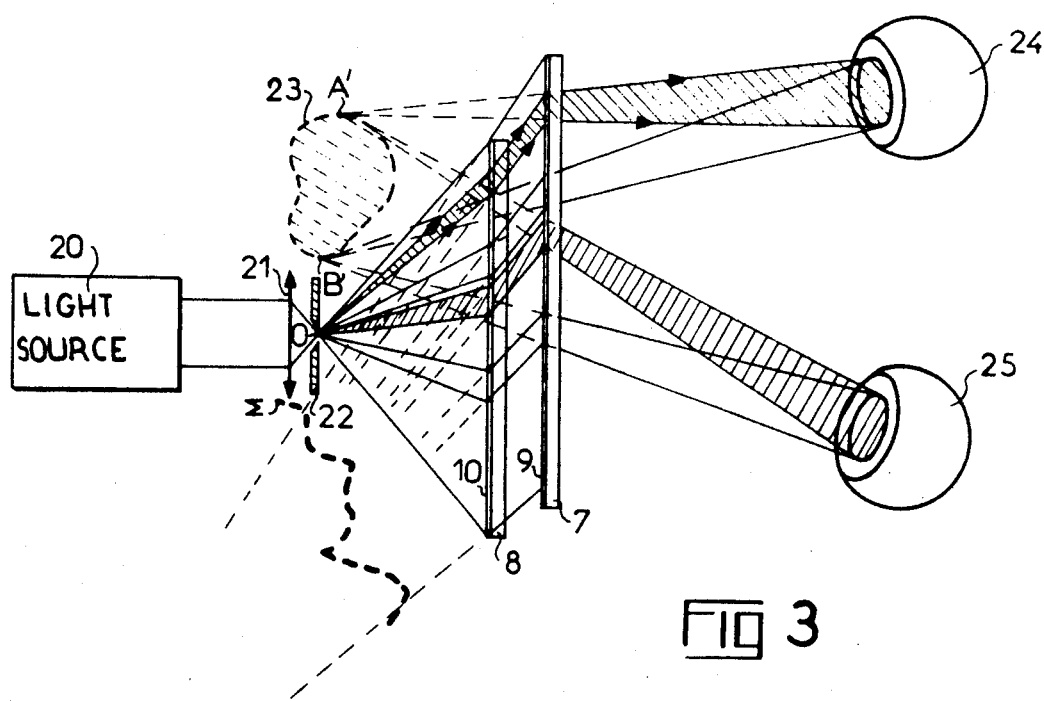
Figure 4:
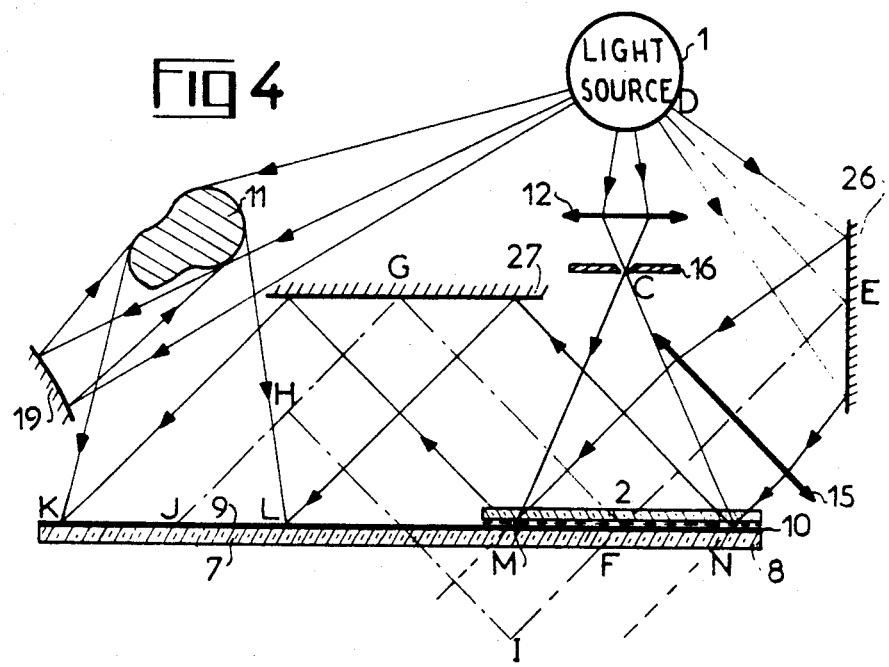

FIG. 3 schematically illustrates an arrangement for reconstructing the image of an object by means of hologram produced in accordance with the invention;

FIG. 4 illustrates a further modification of the arrangement of FIG. 1; and

Figure 5:
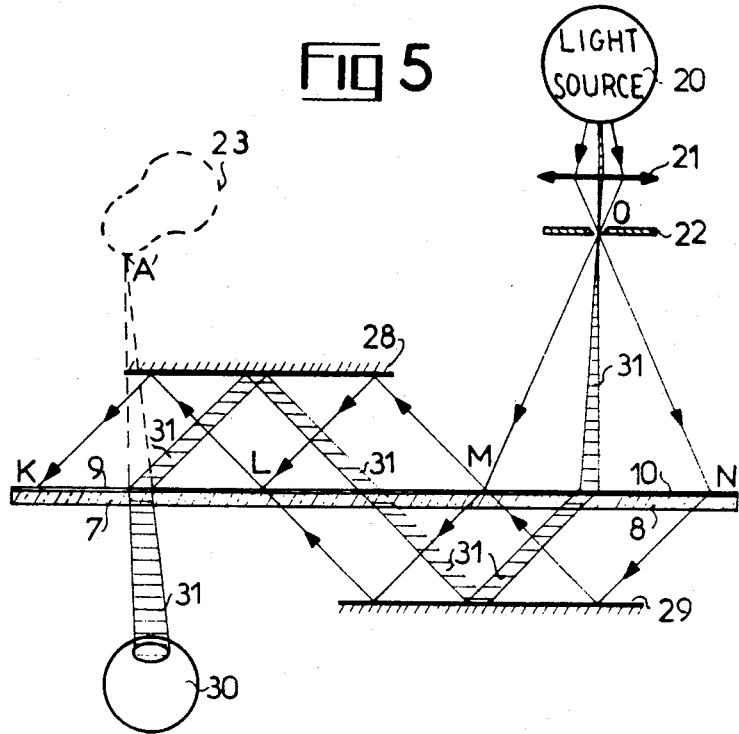

FIG. 5 schematically illustrates an arrangement for reconstructing the image of an object from a pair of coplanar holograms obtained by means of the arrangement of FIG. 4.

The arrangement shown in FIG. 1 comprises a monochromatic, light source 1 such as, for example, an optical cavity with a suitably doped ruby rod. A flash lamp associated with an electrical power source excites the ruby to fluorescence. A source of this kind will by stimulated emission produce a succession of light waves with poor spatial coherence. In particular, the wave surfaces have an amplitude and phase distribution which differ substantially from that which is obtained with a perfectly coherent light source, this distribution varying furthermore from one emission to the next.

Since the reconstruction of the image requires the reproduction of the reference beam used at the time of recording, this condition cannot be satisfied if ruby lasers, currently manufactured and sold, are used.

According to the invention, in order to overcome this drawback, the light beam emitted by the source 1 is split by means of a semireflective plate 2 in order to obtain a reflected beam and a transmitted beam, the respective wave fronts $\Sigma_1$ and $\Sigma_2$ of which are similar to one another during the course of one and the same light emission. The reflected beam represented in full line, is received by a lens 3 and illuminates a semireflective plate 5. The light transmitted by the plate 5 in turn illuminates the object 11 which latter is located in such fashion as to scatter light onto a first photographic emulsion 9 carried by a support 7. The light reflected by the plate 5 forms a reference light beam which interferes in the emulsion 9, with the light scattered by the object 11. The emulsion 9 thus records a pattern of interference fringes characteristic of the optical information emanating from the object 11; this pattern can be read only if the phase distribution of the reference beam is known. This latter distribution having a random character, considered from one emission to the next, the hologram 9 will produce an image of the object 11 only if it is illuminated by a reconstructing beam strictly identical to the reference beam.

In order to satisfy this requirement, the invention provides for the use of a second emulsion 10 carried on a substrate 8. The beam, shown in dotted line, which is passed by the plate 2 is conveyed by a mirror 14 to a lens 4 which illuminates a semireflective plate 6; the light transmitted by the plate 6 is focused by a lens 12 on a point object 13 located at the point C, so as to scatter toward the emulsion 10 a portion of the light energy it receives. The light reflected by the plate 6 interferes in the emulsion 10, with divergent beam coming from the point C; the emulsion 10 thus records a pattern of interference fringes which characterizes the phase distribution of the reflected beam emerging from the plate 6; the morphology of this pattern also depends on the spherical wave front issuing from point C.

The recording arrangement of FIG. 1 operates in the following manner:

The object 11 and the unexposed photographic emulsions 9 and 10 are placed in position, whereupon the source 1 is triggered into operation and emits a light pulse. The emulsion 9 receives a first illumination from the source 1, the light passing through the plate 2, the lens 3, the plate 5 and the points A, B etc. of the object 11. This illumination is superimposed upon another illumination of the light from which passes through the plate 2, the lens 3 and is reflected on the plate 5. Since both illuminations emanate from the same source 1, they give rise to a first pattern of light fringes which is stored in the emulsion 9. A similar procedure takes place simultaneously in relation to the emulsion 10, except that the object 11 is replaced here by a point object located at the point C, and that the light comes from the lens 12 and the mirror 14. After the emulsions 9 and 10 have been developed, an observer placing the hologram 10 in an appropriate position in relation to a point light source C, will see the image of the plate 6 and of what is reflected thereby. Consequently, he will receive a light radiation which has exactly those characteristics of amplitude and phase which were possessed by the reference beam which was used for the exposure of the hologram 9. All that now remains is to place the hologram 9 in front of the hologram 10 in order for the observer to be able to see the image of the object 11. Thus, the juxtaposition of the two holograms 9 and 10 makes it possible to reconstruct the image of the object 11 through the double-diffraction of a reconstructing beam coming from a point light source.

In FIG. 2, a variant embodiment of the recording device of FIG. 1 can be seen. As the device already described, it comprises a monochromatic light source 1, a semireflective plate 2, a first photographic emulsion 9 on a substrate 7, a second photographic emulsion 10 on a substrate 8, and a lens 12 for forming a point source C illuminating the emulsion 10. The light beam emerging from the source 1 passes through a lens 15 which directs it onto a mirror 18, a mirror 17 the plate 2 and the object 11. The plate 2 forms from the light beam which it receives, a reflected light beam which is directed onto the emulsion 10, and a transmitted light beam which is directed onto the emulsion 9; these split beams have respective wave fronts $\Sigma_2$ and $\Sigma_1$ the forms of which are symmetrical in relation to the semireflecting layer of the plate 2. The object 11 is illuminated directly by the source 1 and indirectly by the mirrors 18 and 19; it diffuses light waves onto the emulsion 9 and these waves interfere with the light beam transmitted by the plate 2. The light beam reflected by the plate 2 interferes with the divergent light beam coming from the point C where the light reflected by the mirror 17 is focused by the lens 12; a diaphragm 16 surrounds the point C in order to form at C a substantially point light source.

The operation of the recording arrangement of FIG. 2 is entirely similar to that of the device of FIG. 1. The emulsion 9 receives the optical information relating to the object 11, while the emulsion 10 stores the information relating to the amplitude and phase distributions of the two light beams emerging from the plate 2. The essential difference relates to the light spot C which is constituted by diaphragm 16 containing the hole whereas in the device of FIG. 1 it is constituted by a minute diffusing object 13.

In FIG. 3, a reconstruction device for forming the image of the object 11 from the holograms 9 and 10 produced by the construction devices hereinbefore described, is diagrammatically illustrated. The reconstruction of the holograms is effected by means of a monochromatic light source 20 which may for example be formed by a gas laser. The light beam produced by the source 20 passes through a lens 21 which converges it a the center 0 of a diaphragm 22. The divergent beam coming from the point 0 then illuminates the hologram 10 in the same way in which it was illuminated by the light coming from the point C in the construction devices. A portion of the light diffracted by the hologram 10 illuminates the hologram 9 so that it diffracts light beams in the direction of observers 24 and 25; two of these light beams are shown crosshatched in FIG. 3. The diffraction produced by the hologram 10 is intended to convert the divergent beam issuing from the point 0, into a reconstructing beam the wave fronts $\Sigma$ of which are similar in nature to those of the reference beam used for the storage of the optical information relating to the object; the elements 20, 21, 22 and 10 constitute a reconstructing light source making it possible to reconstruct the image of the object. The second diffraction produced by the hologram 9 makes it possible for the observers 24 and 25 to see a virtual image 23 of the object 11. In FIG. 3, the distance separating the hologram 10 and 9 has been much exaggerated; in practice, the two emulsions can be brought into contact by appropriately situating their substrates 8 and 7; this method of assembly by contact should be borne in mind when initially placing the emulsions 9 and 10 in the recording equipment.

In FIG. 4, a second variant embodiment of the holographic recording device in accordance with the invention, can be seen. This variant embodiment makes it possible to employ a single photographic plate in order to produce the pair of holograms, and this plate can be read in a reconstruction device without any necessity for removing the holograms and fixing them in a mount.

The construction device of FIG. 4 utilizes a photographic plate which groups side-by-side the two sensitized layers 9 and 10 on the substrates 7 and 8 considered in the previous examples. The reference numbers used in the preceding figures have been used here too, in order to point out the unity of the invention and the duality of the holograms. The arrangement comprises a monochromatic light source 1 illuminating an object 11, indirect illumination being effected through the medium of a mirror 19. The source 1 also emits two light beams in the direction of the semireflective plate 2; one of these beams is received by a mirror 26 and a lens 15, while the other beam is received by a lens 12 so that it converges at the points C, the center of a diaphragm 16. The light beam emerging from the lens 15 is reflected by the plate 2 in the direction of a mirror 27 which directs it on to the sensitized layer 9; this layer also receives a light diffused by the object 11. The light beams coming from the point C and from the lens 15, are transmitted by the plate 2 to the sensitized layer 10.

In FIG. 4, it can be seen how the beam coming from D in source 1, follows the trajectory DEF, to the semireflective plate 2; there is splits into two fractions, one being transmitted and interfering in the layer 10 with the transmitted portion of the light energy emerging from point C, and a reflected fraction which follows the trajectory F G H J; said reflected fraction interferes in the layer 9 with the light radiation diffused by the object 11. This process results in a simultaneous formation of an object hologram between the points K and L and of a reference hologram between the points M and N; these holograms are separated by a transparent zone L M which is created either by leaving it clear of emulsion or by masking this zone in order that it is not exposed. It should be pointed out that the plate 2 and the emulsion 10 can simply be applied on top of one another during exposure. It will be observed, too, but that the light beam emerging from the lens 15 serves twice as reference beam and that the trajectory F G H J is equivalent to another trajectory F I H J which will be utilized for the reconstruction of the holograms.

In FIG. 5, the photographic plate of the device shown in FIG. 4, can be seen after development. The plate is introduced into a reconstruction device comprising a coherent light source 20, a lens 21, a diaphragm 22 containing a hole 0, a mirror 29 and a mirror 28, disposed parallel to said plate. The light cone emerging from the point 0 falls upon the reference hologram M N which diffracts onto the mirror 29 a reference light beam; this beam is reflected onto the transparent window L M and falls upon the mirror 28 which reflects it onto the object hologram K L. Since the trajectory taken by the emergent beam from the hologram M N is equivalent to the trajectory followed by a beam of the same kind used during recording, the hologram K L receives light which is identical to the light which it received from the mirror 27 in the device shown in FIG. 4. This latter hologram therefore diffracts light radiation similar to the light radiation diffracted by the object 11.

An observer 30 located behind the hologram K L will see the virtual image 23 of the object 11; in the FIG. 5, the crosshatched trace of a light beam 31 emerging from a source 20 and entering the pupil of the eye of the observer 30, can be seen; this light beam is successively subjected to focusing, a first diffraction, a first reflection, a second reflection and a second diffraction, following which, by extension it will be seen that it represents the point A' of the image 23 of the object.

Of course the invention is not limited to the embodiments described and shown which were given solely by way of example.

What is claimed is:

1. An arrangement for constructing an holographic representation of an object by means of a source of coherent light which does not have reproducible wave fronts, said arrangement comprising: means for splitting a luminous beam emitted from said source into two reference beams having the same wave fronts; means for directing onto said object a portion of the luminous energy emerging from said source; a first photographic emulsion located for simultaneously receiving the light scattered by said object and at least one portion of the luminous energy contained in one of said reference beams for forming a first hologram; means for constructing from another portion of the luminous energy emerging from said source a punctual source of light; and a second photographic emulsion located for simultaneously receiving the luminous energy emerging from said punctual source and at least one portion of the luminous energy contained in said other reference beam for forming a second hologram.

2. A constructing arrangement as claimed in claim 1, wherein said object is illuminated by a portion of the luminous energy of said one reference beam; said punctual source of light being a scattering punctual element positioned for receiving a portion of the luminous energy contained in said other reference beam.

3. A constructing arrangement as claimed in claim 1, wherein said splitting means comprise a semitransparent plate.

4. A constructing arrangement as claimed in claim 1, wherein semitransparent plates are respectively positioned on the paths of said reference beams.

5. A constructing arrangement as claimed in claim 1, wherein said punctual source constructing means comprise a focusing optical combination.

6. A constructing arrangement as claimed in claim 5, wherein a pinhole diaphragm is positioned at the focus of said focusing optical combination.

7. A constructing arrangement as claimed in claim 1, wherein said emulsions are provided on distinct supports.

8. A constructing arrangement as claimed in claim 7, wherein said distinct supports are parallel to each other.

9. A constructing arrangement as claimed in claim 8, wherein said splitting means comprise a semitransparent plate parallel to said supports and at equal distances from them.

10. A constructing arrangement as claimed in claim 1, wherein said emulsions are positioned on a plane support.

11. A constructing arrangement as claimed in claim 10, wherein said splitting means comprise a semitransparent plate parallel to said support.

12. A constructing arrangement as claimed in claim 11, wherein said semitransparent plate lies on one of said emulsions; a reflecting plate parallel to said support being positioned for receiving one of said reference beams upon emerging from said semitransparent plate.

13. A reconstruction arrangement for reconstructing the image of an object from an holographic representation thereof constructed by an arrangement operated with a source of coherent light which does not have reproducible wave fronts, and comprising: means for splitting a luminous beam emitted from said source into two reference beams having the same wave fronts; means for directing onto said object a portion of the luminous energy emerging from said source; a first photographic emulsion located for simultaneously receiving the light scattered by said object and at least one portion of the luminous energy contained in one of said reference beams for forming a first hologram; means for constructing from another portion of the luminous energy emerging from said source a punctual source of light; and a second photographic emulsion located for simultaneously receiving the luminous energy emerging from said punctual source and at least one portion of the luminous energy contained in said other reference beam for forming a second hologram said first and second holograms being formed simultaneously; said reconstruction arrangement comprising a point source of spatially coherent light illuminating the portion of said holographic representation corresponding to said second emulsion for reconstructing a reference beam; and means for bringing said reference beam onto the remaining portion of said holographic representation.

14. An arrangement as claimed in claim 13, wherein said holograms are carried by distinct supports facing each other.

15. An arrangement as claimed in claim 13 wherein said holograms are located at a distance from each other on a single-plane support.

16. A reconstruction arrangement as claimed in claim 13, wherein said last-mentioned means comprise a pair of parallel mirrors.

17. A constructing arrangement as claimed in claim 1, wherein said source is a pulsed laser.

* * * * *